Jan. 5, 1965

J. E. MARTENS 3,164,029

SCREW-NUT DEVICE

Filed March 7, 1961

INVENTOR.
JACK E. MARTENS

BY W. E. Recktenwald
K. E. Walden
ATTORNEY 3,164,029
SCREW-NUT DEVICE
Jack E. Martens, Gary, Ind., assignor to The Anderson Company, a corporation of Indiana
Filed Mar. 7, 1961, Ser. No. 94,041
7 Claims. (Cl. 74—424.8)

This invention relates to motion-transmitting mechanisms and more particularly to motion-transmitting mechanisms of the type including a screw and an antifriction nut cooperable therewith.

An object of the invention is to provide an improved motion-transmitting mechanism of the nut-and-screw type.

Another object of the invention is to provide a screw-nut type of motion-transmitting mechanism which is easily operable under load but which will retain an adjusted position under load despite shock and vibration.

Another object of this invention is to provide a screw-nut mechanism wherein the nut is provided with a limited frictional force to restrain its free rotation on the screw.

Still another object of this invention is to provide a screw-nut wherein the roller is braked to restrain uncontrolled free rotation of the nut relative to the screw.

A further object of the invention is to provide an improved screw-nut operated telescoping leg assembly particularly adaptable to hospital beds.

Other objects and advantages of the invention will become apparent after the description hereinafter set forth is considered in conjunction with the drawing annexed hereto.

Figure 1:
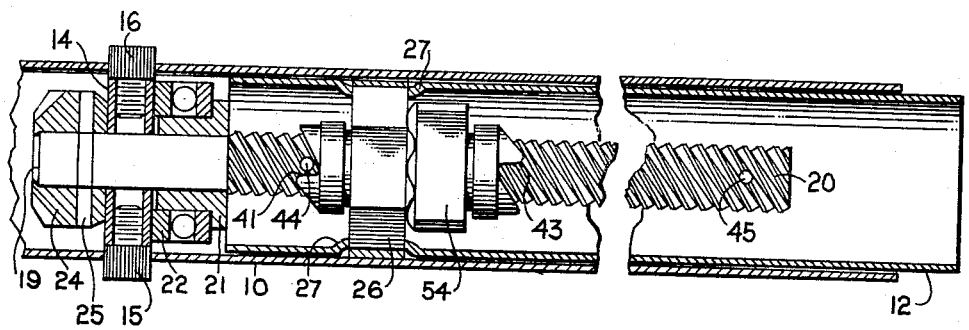
FIGURE 1 is an elevational view partially in section of the improved telescoping leg assembly of my invention.

FIGURE 1 shows a portion of an outer tubular member or leg 10 telescopingly and adjustably mounted on a tubular inner base member or leg 12. A support member 14 is provided at its sides with a plurality of apertures for threadedly receiving mounting studs, such as studs 15 and 16, extending through apertures in leg 10. An unthreaded reduced diameter end portion 19 of a helically threaded screw 20 extends centrally through support member 14 for rotation therethrough.

A flanged collar 21 is mounted on reduced diameter end portion 19 for mounting a thrust bearing 22 adjacent the support member 14.

A bevel gear 24 is secured to end portion 19 on the opposite side of support member 14 by means of a pin 25. As will be understood by those skilled in the art, the bevel gears 24 in each of four legs of a hospital bed are driven by a system of shafts and bevel gears (not shown) operable by a single crank handle.

A nut member 26, preferably made of steel, is suitably fixed to the inner base leg 12 from above and below by inturned detents 27 so as to be secured against relative movement axially thereof. The nut member 26 cooperates with a plurality of rollers 28 retained in a carrier or cage member 29 surrounding screw 20. The rollers 28 also cooperate with a member 54, to be hereinafter described.

The cage member 29 may be stamped from a flat sheet and rolled into a tubular shape, and annular bands 30 and 31 may be staked thereto to retain the shape. The cage member may be embossed as at 33, 34, 35a and 35b to provide additional strength, and windows 38, 39 and 40 may be provided therein to receive rollers 28.

Each of the ends of cage member 29 is formed to provide a pair of axially extending shoulders, one shoulder of each pair being visible, as indicated at 41 and 42, and a second pair (not visible) positioned 180 degrees from the one pair and facing in the same peripheral direction. These pairs of shoulders are respectively engageable with a pair of stop pins 44 and 45 (FIGURE 1) extending through screw 20 and projecting from opposite sides thereof.

Each roller 28 is formed with four radially enlarged bearing surfaces 47, 48, 49 and 50 for rollingly engaging the threads of screw 20. The bearing surfaces 47 and 48 are maintained in engagement with screw 20 by a raceway 52 formed on the inner periphery of nut member 26. The raceway 52 is substantially J-shaped to radially engage bearing surface 47 and to conform to the lower half of bearing surface 48 for supporting and resisting axial loading.

The bearing surfaces 49 and 50 are maintained in engagement with screw 20 by a raceway 56 on the inside of member 54. The raceway 56 is cylindrically straight, except in the central portion thereof where it protrudes radially inwardly between bearing surfaces 49 and 50 as indicated by numeral 51.

The nut members 26 and 54 are urged apart by an annular leaf spring 58 spaced therebetween. The member 54 may be made of a nonmetallic material, nylon having been found very satisfactory. As pointed out above, the nut member 26 is staked or otherwise fixed to inner base leg 12, and the load on screw 20 is transferred to nut member 26 by bearing surfaces 48 of rollers 28.

It can be seen that rotation of screw 20 through bevel gear 24 will produce relative axial movement of nut 26 which in turn will carry inner base leg 12 linearly extensively with respect to outer leg 10. Legs 10 and 12 are positioned for relative axial movement but are restrained against relative rotary movement. A restraining means to prevent relative rotation of the legs is not shown in FIGURE 1; however, this can be accomplished by the particular shape of the legs 10 and 12 or by a cooperating linear slot or indentation, or by nonrotatably mounting each of the legs to portions of the bed or other elements to be adjusted.

Figure 2:
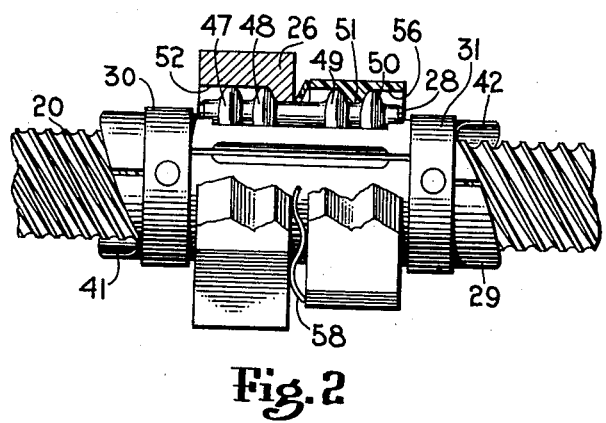
FIGURE 2 is an enlarged elevational view of my improved motion-transmitting mechanism, partially in section and with the ends of the screw broken away.
Figure 3:
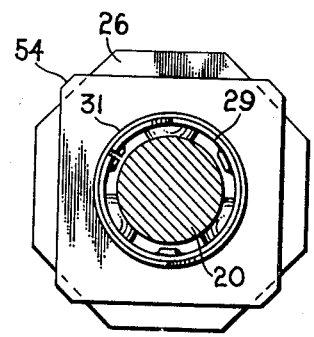
FIGURE 3 is an end view of the device of FIGURE 2.
Figure 4:
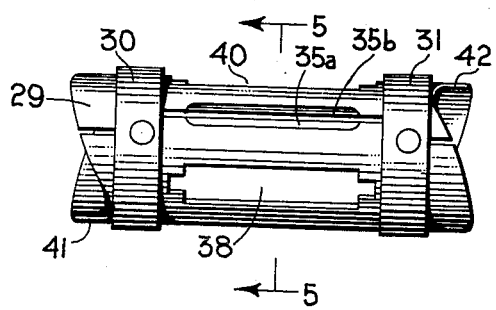
FIGURE 4 is an elevational view of the carrier or cage portion of the motion-transmitting mechanism.
Figure 5:
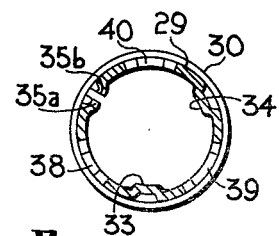
FIGURE 5 is a view of the carrier, taken along section line 5—5 of FIGURE 4.

Nut member 26 is normally designed to carry an axial load in one direction, as can be clearly seen in FIGURE 2. Annular member 54 being constantly urged axially from nut 26 by spring 58 acts against the side of bearing surfaces 50 whereby rollers 28 are somewhat restrained or retarded against free rotation; and bearing 48 is maintained in axial contact with raceway 52.

Member 54 does not carry any substantial load, but serves as a retarding member. Thus, while the antifriction characteristics imparted by rollers 28 permits operation under load, the member 54 helps maintain an adjusted position of the nut 26 and screw 20 despite shock and vibration. It is apparent that a momentary axial jar on the nut-screw mechanism will not readily permit bearing surface 48 of roller 28 to become unseated from raceway 52 to permit the roller to move or roll unrestrained or involuntarily along the helical threads of screw member 20. This is by reason of the resilient drag of member 54 against the rollers 28.

It will be seen that I have provided an improved nut-and-screw motion-transmitting mechanism of the antifriction type, which, though particularly adapted for use in hospital beds, is not limited to such use.

Various modifications may be made in the structure disclosed without departing from the spirit and scope of the invention; and, therefore, I do not wish to be understood as limiting the invention to the exact forms, constructions, arrangements and combinations of parts herein shown and described.

I claim:

1. A motion-transmitting mechanism comprising in combination: first and second members adapted for relatively linear movement and respectively attachable to members to be relatively moved, one of the members fixedly carrying a nut and the other member rotatably carrying a screw member operatively received within the nut member, said nut member including a housing having an annular raceway and a portion of reduced diameter to define axial abutment means, elongate rotatable bearing elements interposed between the threads of the screw member and the raceway and adapted to engage the axial abutment means thereby establishing driving contact between the screw and nut whereby rotation of the screw moves the nut axially therealong, and means rotatable with respect to said nut and urged axially with respect thereto for applying frictional drag to the rotatable elements thereby impeding involuntary rotation.

2. A motion-transmitting mechanism comprising in combination: first and second members adapted for relatively linear movement and respectively attachable to members to be relatively moved, one of the members fixedly carrying a nut and the other member rotatably carrying a screw member operatively received within the nut member, said nut member including a housing having an annular raceway and a portion of reduced diameter to define axial abutment means, rotatable bearing elements interposed between the threads of the screw member and the raceway and adapted to engage the raceway and axial abutment means thereby establishing driving contact between the screw and nut whereby rotation of the screw moves the nut axially therealong for relative linear movement of first and second members, means to space the rotatable elements peripherally of the threaded member, and additional means rotatable with respect to said nut and surrounding the spacing means and urged axially in frictional contact with the rotatable bearing elements to thereby impede their voluntary rotation.

3. A motion-transmitting mechanism comprising in combination: first and second members adapted for relatively linear movement and respectively attachable to members to be relatively moved, one of the members fixedly carrying a nut and the other member rotatably carrying a screw member operatively received within the nut member and adapted to be rotated, said nut member including a housing having an annular raceway and a portion of reduced diameter to define axial abutment means, rotatable bearing elements interposed between the threads of the screw member and the raceway and adapted to engage the raceway and axial abutment means thereby establishing driving contact between the screw and nut whereby rotation of the screw moves the nut axially therealong and said first and second member linearly with respect to each other, means spacing the rotatable bearing elements peripherally of the threaded member, annular means surrounding the bearing elements in contact therewith and rotatable with respect to said nut, and resilient means interposed between the nut member and annular means for establishing a frictional drag on the rotatable bearing elements with which it is in contact.

4. A motion-transmitting mechanism comprising in combination: first and second members adapted for relatively linear movement and respectively attachable to members to be relatively moved, one of the members fixedly carrying a nut and the other member rotatably carrying a screw member operatively received within the nut member, said nut member including a housing having an annular raceway and a portion of reduced diameter to define axial abutment means, elongate rotatable elements having spaced-apart radially enlarged bearing surfaces interposed between the threads of the screw member and the raceway and adapted to engage the axial abutment means thereby establishing driving contact between the screw and nut whereby rotation of the screw moves the nut axially therealong, cage means spacing the rotatable bearing elements peripherally of the threaded member, and means spaced axially from the nut member and rotatable with respect thereto and resiliently urged into frictional contact with the rotatable elements thereby impeding their involuntary rotation.

5. A motion-transmitting mechanism comprising in combination: first and second members adapted for relatively linear movement and respectively attachable to members to be relatively moved, one of the members fixedly carrying a nut and the other member rotatably carrying a screw member operatively received within the nut member, said nut member including a housing having an annular raceway and a portion of reduced diameter to define axial abutment means, elongate rotatable elements having spaced-apart radially enlarged bearing surfaces interposed between the threads of the screw member and the raceway and adapted to engage the axial abutment means thereby establishing driving contact between the screw and nut whereby rotation of the screw moves the nut axially therealong, cage means spacing the rotatable bearing elements peripherally of the threaded member, annular means spaced axially from the nut member adjacent an additional radially enlarged bearing surface and including resilient means urging the brake means into frictional contact with said additional radially enlarged bearing surface to impede their rotation, said annular means being rotatable with respect to said nut in response to a force to overcome said resilient means.

6. A motion-transmitting mechanism comprising in combination: first and second members adapted for relatively linear movement and respectively attachable to members to be relatively moved, one of the members fixedly carrying a nut and the other member rotatably carrying a screw member operatively received within the nut member, said nut member including a housing having an annular raceway and a portion of reduced diameter to define axial abutment means, elongate rotatable elements having spaced-apart radially enlarged bearing surfaces interposed between the threads of the screw member and the raceway and adapted to engage the axial abutment means thereby establishing driving contact between the screw and nut whereby rotation of the screw moves the nut axially therealong, cage means spacing the rotatable bearing elements peripherally of the threaded member, and annular means spaced axially from the nut member and rotatably mounted with respect thereto, said annular means including resilient means adjacent the nut member urging said annular means into axial frictional contact with the radially enlarged bearing surfaces to impede rotation of another of said rotatable elements.

7. A motion-transmitting mechanism comprising in combination: first and second members adapted for relatively linear movement and respectively attachable to members to be relatively moved, one of the members fixedly carrying a nut and the other member rotatably carrying a screw member operatively received within the nut member, said nut member including a housing having an annular raceway and a portion of reduced diameter to define axial abutment means, elongate rotatable elements having spaced-apart radially enlarged bearing surfaces interposed between the threads of the screw member and the raceway and adapted to engage the axial abutment means thereby establishing driving contact between the screw and nut whereby rotation of the screw moves the nut axially therealong, and means rotatably mounted with respect to the nut member and adapted to be urged into axial contact with another radially enlarged bearing surface of said elongate rotatable elements to thereby establish frictional drag thereon to impede involuntary rotation of the nut member with respect to the screw member.

References Cited in the file of this patent

UNITED STATES PATENTS

| | | |
|---|---|---|
| 2,623,403 | Terdina | Dec. 30, 1952 |
| 2,757,548 | Smith et al. | Oct. 7, 1954 |
| 2,842,978 | Orner | July 15, 1958 |
| 2,919,596 | Kuehl | Jan. 5, 1960 |
| 2,966,071 | Wise | Dec. 27, 1960 |
| 2,979,965 | Diehold | Apr. 18, 1961 |
| 3,014,380 | Martens | Dec. 26, 1961 |

OTHER REFERENCES

Publication: "Ball Bearing Screw and Spline Operation"; Saginaw Steering Gear Division—General Motors Corp., Saginaw, Michigan; September 6–16, 1960, page 16. (Copy in Div. 12.)

UNITED STATES PATENT OFFICE
CERTIFICATE OF CORRECTION

Patent No. 3,164,029 January 5, 1965

Jack E. Martens

It is hereby certified that error appears in the above numbered patent requiring correction and that the said Letters Patent should read as corrected below.

Column 3, line 55, for "voluntary" read -- involuntary --; column 4, line 67, for "the radially enlarged bearing surfaces" read -- another of said radially enlarged bearing surfaces --; line 68, for "rotation of another of said rotatable elements" read -- rotation of the rotatable elements --.

Signed and sealed this 24th day of August 1965.

(SEAL)
Attest:

ERNEST W. SWIDER
Attesting Officer

EDWARD J. BRENNER
Commissioner of Patents